(12) United States Patent
Bastioli et al.

(10) Patent No.: US 7,645,839 B2
(45) Date of Patent: Jan. 12, 2010

(54) BINARY MIXTURES OF BIODEGRADABLE ALIPHATIC POLYESTERS AND PRODUCTS OBTAINED FROM THESE

(75) Inventors: Catia Bastioli, Novara (IT); Gianfranco Del Tredici, Sesto Calende (IT); Italo Guanella, Romentino (IT); Giovanni Floridi, Novara (IT); Roberto Ponti, Oleggio (IT)

(73) Assignee: Novamont S.p.A., Novara (IT)

( * ) Notice: Subject to any disclaimer, the term of this patent is extended or adjusted under 35 U.S.C. 154(b) by 1100 days.

(21) Appl. No.: 10/470,098

(22) PCT Filed: Jan. 25, 2002

(86) PCT No.: PCT/EP02/00760

§ 371 (c)(1),
(2), (4) Date: Nov. 19, 2004

(87) PCT Pub. No.: WO02/059200

PCT Pub. Date: Aug. 1, 2002

(65) Prior Publication Data

US 2005/0090625 A1 Apr. 28, 2005

(30) Foreign Application Priority Data

Jan. 25, 2001 (IT) .......................... TO2001A0062

(51) Int. Cl.
*C08G 63/00* (2006.01)
(52) U.S. Cl. ...................... 525/437; 525/450; 428/35.2; 428/35.7; 428/36.92

(58) Field of Classification Search ................. 525/437, 525/450; 428/35.2, 35.7, 36.92
See application file for complete search history.

(56) References Cited

U.S. PATENT DOCUMENTS

| 5,883,199 A | * | 3/1999 | McCarthy et al. ............ 525/437 |
| 6,235,825 B1 | * | 5/2001 | Yoshida et al. ............... 524/314 |

FOREIGN PATENT DOCUMENTS

| EP | 0 980 894 A1 | 2/2000 |
| EP | 1 033 383 A1 | 9/2000 |
| EP | 1033383 A1 * | 9/2000 |
| GB | 2 332 204 A | 6/1999 |
| WO | WO 9925758 A1 * | 5/1999 |
| WO | WO 9945067 A1 * | 9/1999 |

* cited by examiner

*Primary Examiner*—Randy Gulakowski
*Assistant Examiner*—Alicia M Toscano
(74) *Attorney, Agent, or Firm*—Connolly Bove Lodge & Hutz LLP

(57) ABSTRACT

A biodegradable mixture obtained by melt mixing polyesters comprising (A) an aliphatic polyester obtained from aliphatic diacids selected from the group consisting of azelaic acid, sebacic acid, brassilic acid, mixtures thereof and mixtures of said acids with aliphatic dicarbossilic acids and/or aliphatic hydroxyacids containing more than 50 mole % of azelaic acid, sebacic acid and brassilic acid, and from aliphatic diols; (B) a polymer of lactic acid in which the concentration by weight of A with respect to (A+B) is in the range of 30 to 60% and in which the sum of the fusion entalpy $\Delta H_A$ and $\Delta H_B$ of the two polyesters in the mixture is greater than the sum of the fusion entalpies $\Delta H_1$ and $\Delta H_2$ of the polyesters prior to melt mixing.

17 Claims, No Drawings

BINARY MIXTURES OF BIODEGRADABLE ALIPHATIC POLYESTERS AND PRODUCTS OBTAINED FROM THESE

The present invention relates to biodegradable mixtures comprising at least two aliphatic polyesters in proportions such that it is possible to obtain a film, by blowing or casting, provided with improved water barrier properties with respect to individual polyesters, of high rigidity, transparency and biodegradability as well as solid and expanded (foamed) sheets and associated thermoformed products with optimum barrier properties and rigidity.

Such composite materials are particularly suitable for the food packaging sector.

PRIOR ART

Conventional polymers such as polystyrene, polyethylene terephthalate and similar are characterised not only by an excellent rigidity, but also by good barrier properties against water and by good transparency. These polymers are used in the packaging sector in general, and in food packaging in particular, as well as in the sector of disposable dishes such as plates, cups and cutlery. Their low biodegradability and the difficulty of recovering the, different starting plastics in a sufficiently differentiated manner upon recycling has however created an increasing problem of disposal in recent decades.

Polymers such as L-polylactic acids, D,L-polylactic acids, D-polylactic acids and their co-polymers are biodegradable thermoplastic materials from renewable sources; they are transparent with excellent resistance to fungi and therefore suitable for packaging food as well as preservation of their organoleptic characteristics. On the other hand they biodegrade slowly in the soil and, in compost, degrade quickly only at high temperatures. The greatest limitation, however, lies in the low processability, upon recycling of waste, and also in that for many applications the permeability to water is too high.

If, on the other hand, aliphatic polyesters constituted predominantly of monomers from renewable sources starting from diacidic diols, in particular polymers of sebacic, brassylic and azelaic acids are considered, these have the limitation that their rigidity is too low and their water permeability is too high. For this reason products prepared from these resins are also inadequate as rigid materials for packaging.

Binary mixtures of polylactic acid and aliphatic polyesters have constituted the subject of many patents. In particular, European Patent EP-0 980 894 A1 (Mitsui Chemical) claims a significant improvement in the tear strength and balance of film based on a blend of polylactic acid and other polyesters such as polybutylene succinate, with a melting point of between 80 and 250° C., by introducing a plasticiser into the blend. This, however, gives a non-transparent film with, in any event, very modest strength of the order of 120 g in accordance with the JIS P8116 method. The presence of a plasticiser, moreover, places limitations on contact with food, and the disadvantage of ageing phenomena.

U.S. Pat. No. 5,883,199 relates to binary mixtures of polylactic acid and polyester with the polyester forming a continuous or co-continuous phase and the polylactic acid content lying between 10 and 90%. Such mixtures, in accordance with the indicated examples, do not show significant reduction in the permeability to water or steam.

EP-1 033 383 relates to a biodegradable film comprising a polylactic acid-family polymer and other aliphatic polyester than the polylactic acid-family polymer charactherized in that the heat for fusion converted to the polylactic acid-family polymer when the temperature of the film is raised is 35 J/g or under. Such patent does not deal with the problem of improving the barrier properties against water of the biodegradable film and one of the main target of the invention is to find out a biodegradable film with excellent heat sealability. Among the other alyphatic polyester used toghether with the polylactic acid-family polymer, EP-1 033 383 describes as preferable polyesters having dicarboxilic acid units and aliphatic diol units among which polybutylene sebacate is mentioned even though mixtures of said polymer with a polylactic acid family polymer do not show at all heat sealability properties such as those claimed in the patent. On the contratry the heat sealability properties are very poor and even lower than those reported in the comparative examples not belonging to the invention.

SUBJECT OF THE INVENTION

Starting from the problem of finding a material able to combine properties of transparency, rigidity and water barrier it has now surprisingly been found that by combining a polymer of polylactic acid with diacid/diol aliphatic polyesters in specific ratios as described hereinafter there is a critical range of compositions in which it is possible to obtain, entirely unexpectedly, a significantly lower permeability to water with respect to the individual polymers, as well as modulus of elasticity in tension greater than any envisaged from the Halpin/Tsai mixture rule, and an optimum transparency.

DESCRIPTION OF THE INVENTION

The invention relates to a biodegradable mixture obtained by melt mixing polyesters comprising:
(A) An aliphatic polyester obtained from aliphatic diacids chosen among azelaic acid, sebacic acid and brassilic acid, or mixtures thereof with aliphatic dicarbossilic acids and hydroxyacids containing more than 50 mole % of azelaic acid and/or sebacic acid and/or brassilic acid, and from aliphatic diols said polyester having a modulus of elasticity comprised from 400 and 900 MPa and a breaking elongation greater than 200% on blown film of about 25-30 μm, average ponderal molecular weight greater than 55,000 and a melting point from 40 to 95° C.;
(B) A polymer of lactic acid comprising L or D polylactic acid, L,D-polylactic, meso polylactic acid and lactic acid copolymers with hydroxyacids or lactones thereof containing at least 75% of L-lactic or D-lactic acid with average ponderal molecular weight higher than 70,000 and with a modulus of elasticity greater than 1500 MPa;
in which the concentration by weight of A with respect to (A+B) is in the range from 30 to 60% and blown films of thicknesses of 25-30 μm have a modulus of elasticity greater than 1400 MPa, a permeability to water comprised from 170 to 40 g30 μM/m²24 h and in which the sum of the fusion entalpies $\Delta H_A$ and $\Delta H_B$ of the two polyesters A) and B) in the mixture is greater than the normalized sum of the fusion entalpies $\Delta H_1$ and $\Delta H_2$ of the aliphatic polyesters A) and B) prior melt mixing.

For normalised sum it is meant the sum obtained by multiplying the $\Delta H_1$ and $\Delta H_2$ fusion entalpies for the percentage divided by 100 of the two polyesters present in the mixture.

The increase of the fusion entalpies $\Delta H_A + \Delta H_B$ of the two polyesters in the mixture with respect to their normalised sum $\Delta H_1 + \Delta H_2$ shows an unexpected increase of cristallinity in the mixture which is the cause of the surprisingly very low value of the permeability to water and the low heat sealability exibited by the composition according to the invention.

The mixture of biodegradable polyesters according to the invention is obtained from a process which involves working in a twin screw or single screw extruder in temperature conditions between 140 and 200° C., performing the two steps of the mixing process and film forming together or separately. Film forming separate from the mixing process is achieved with conventional machines for the extrusion of low or high density polyethylene with a temperature profile in the range between 140 and 200° C., and it is possible to obtain films having thicknesses lying between 5 and 250 μm. Film forming at temperatures lying between 185 and 200° C. is preferred.

Film with thicknesses of 25-30 μm has characteristics of transparency lying in the range 35-80% for the source transmittance, and in the interval 90-95% for the entry point transmittance. The permeability to steam or water at 38° C. with a relative humidity on one side of the film of 10%, to obtain a $\Delta$ relative humidity of 90% in static conditions, lies between 170 and 40 grams of water referred to 30 μm of thickness of the film which passes through a square metre of surface in twenty-four hours (g30 μm/m²24 h) and more preferable between 120 and 70 grams (g30 μm/m²24 h). The individual polymers constituting the mixture according to the invention, in the same film conditions, give values of permeability lying between 200 and 800 gr. (g30 μM/m²24 h).

The tensile properties in the longitudinal film direction in terms of modulus of elasticity measured according to ASTM 882 exceed 1000 MPa and preferably 1400 MPa.

In the mixing phase polymers of type A with MFI (150° C., 2.16 kg) lying between 1 and 10 dg/min are preferred and polymers C with MFI (i90° C., 2.16 kg) lying between 2 and 30 dg/min are preferred.

The polymer (A) includes, as above specified, polyesters obtained from azelaic, sebacic or brassilic acids or mixtures thereof in mixture with less than 50% by moles of aliphatic dicarbossilic acids and/or aliphatic hydroxyacids.

Typical hydroxy acids include glycolic acid, lactic acid, 3-hydroxybutyric, 4-hydroxybutyric, 3-hydroxyvaleric, 4-hydroxyvaleric, and 6-hydroxycaproic acid and further includes cyclic esters of hydroxycarboxylic acids such as glycolides, dimers of glycolic acid, ϵ-caprolactone and 6-hydroxycaproic acids. Mixtures of these acids can be used.

Examples of aliphatic dicarbossilic acids are oxalic acid, malonic acid, succinic acid, glutaric acid, adipic acid, pimelic acid, suberic acid, undecandioic acid, and dodecandioic acid.

Specific glycols useable in the preparation of the A) polyester are ethylene glycol, diethylene glycol, triethylene glycol, polyethylene glycol, 1,2- and 1,3-propylene glycol, 1,3-butandiol, 1,4-butandiol, 3-methyl -1,5-pentandiol, 1,6-hexandiol, 1,9-nonondiol, dipropylene glycol, 1,11-undecandiol, 1,13-tridecandiol, neopentyl glycol, polytetramethylene glycol, 1,4-cyclohexane dimethanol and cyclohexane diol. Mixtures of these glycols can be used.

All the compounds above mentioned are combined in such a way as to form polyesters with mechanical characteristics of tensile resistance to elongation greater than 300% and modulus of elasticity lying between 400 and 900 MPa on blown films of at least 30 μm thickness and with a melting point between 40 and 95° C., preferably between 55 and 85° C. and more preferably between 57 and 79° C. Particularly preferred polyesters are those preferably containing more than 70 mole % and even more preferably more than 90 mole %, of the total of units deriving from azelaic, sebacic, or brassylic acid or their mixtures.

Also included in polymers of type A are polyamide polyesters where the polyester part is as described above and the polyamide part can be caprolactam, and aliphatic diamine such as hexamethylene diamine or even an amino acid. The type A polyesters can also contain aromatic diacids in quantities less than 5 moles %. Polycarbonates also belong to polymers of type A.

The polyesters can beobtained by polycondensation or, as in the case of glycolides and lactones, by ring opening according to known methods. Morever, polyesters can be branched polymers with the introduction of polyfunctional monomers such as glycerine, epoxyoized soya oil, trimethylpropane and the like or polycarboxylic acids such as butantetracarboxylic acid.

Regrading with isocyanates can take place in the molten state at the end of the polymerisation reaction or in the extrusion phase, or in the solid state as described in the Novamont Patent WO 99/28367. The two types of polymers A and B can also have additives such as chain extenders or cross linking agents of the type described above in the mixing phase.

Ratios between polymer A and polymer B different from those indicated for the mixtures according to the present invention give rise to products not having sufficient barrier properties and, in the case of excessively high content of polymer A, excessively low modulus of elasticity.

The material obtained from the mixture of two polymers A and B does not need plasticisers which create problems of migration especially for food packaging. However, quantities of plasticisers below 5% with respect to polymers A+B can be added.

Various additives can also be incorporated in the mixture, such as antioxidants, UV stabilisers, stabilisers against heat and hydrolysis, flame retardants, slow release agents, organic and inorganic fillers such as, for example, natural fibres, anti-static agents, humectants, colorants and lubricants.

In particular, in the production of blown or cast film the following can be added: silica, calcium carbonate, talc, kaolin, kaolinite, zinc oxide, wollastonites, various hydrotalcites and in general lamellar inorganic substances whether or not functionalised with organic molecules capable of delamellating in the mixing phase with the polymeric mixture or with one of the individual polymers of the mixture to give nanocomposites with improved antiblocking and barrier properties. The various inorganic substances can be used in mixtures or with individual products. The concentration of the inorganic additives is generally between 0.05 and 30%, preferably between 0.5 and 20%.

To improve the film-forming characteristics there can be added amides of aliphatic acids such as oleamide, stearamide, erucamide, behenamide, N-oleylpalmitamide, N-stearylerucamide and other amides, salts of fatty acids such as aluminium, zinc or calcium stearate and the like. The quantities of these additives vary from 0.05 to 7 parts and preferably between 0.1 and 5 parts of the polymer mixture.

The mixture thus obtained can be transformed into a film by blowing or extrusion through a flat head, can be extruded as a solid sheet or a foamed or expanded sheet and then heat formed. The films are transparent, have a high resistance to water (water barrier) with respect to the biodegradable starting materials according to CEN 13432, and moreover have a sufficient rigidity for food packagings which require rigid films. The film is poorly weldable and can be obtained in thickness up to 5μm by blowing or casting.

In the non-food field the films obtained with the mixture according to the invention are excellent for applications such as films for adhesive tape, tapes for nappies, for ornamental coloured tapes, for adhesive tapes of different form and use and moreover in applications such as bags for clothing, or film for wrapping flowers, plants and gift objects.

In the food field the films obtained from the mixture according to the invention, thanks to their very low value of permeability, are excellent for applications such as packets for dried products (biscuits, crackers, crisps, chipsters and the like), chocolate, cheese, meat, vegetables etc. In addition, the low heat-sealability of the mixture according to the invention allows specific applications in the food field such as joining and tear strip films for sealing food containers.

The films advantageously find use also in agriculture or in any event for outside use and can contain UV stabilisers in the form of individual films or coextrusions with films having a low modulus, as in the case of starch-based materials, to give improved UV resistance, improved barrier properties, and a different rate of degradation in the atmosphere and in the ground.

The films can moreover be surface treated with aluminium or silica or others, and can be laminated with other materials so as to combine different characteristics (barrier to oxygen and/or to water, peelability, connectability etc). For these cases, as particularly advantageous examples of practical applications, one can mention containers for yoghurt, cheese, meat, bread, biscuits, potatoes and snacks in general, bowls for industrial use, and containers for fragile objects such as eggs.

The films can advantageously be used as the component of a multi-layer film composed of at least one layer of polylactic acid or other polyester, non-destructured starch (and its blends with synthetic and natural polymers) or as components of a multi-layer with aluminium and other materials or with a vacuum metalised layer with aluminium, silica and other inorganic materials. The multi-layers can be obtained by coextrusion or by lamination or by extrusion coating, if one layer is paper or other material which does not melt between 100 and 200° C.

The biodegradable polymer compositions according to the invention can moreover find advantageous use in the form of articles different from film. For example, they can be used to obtain fibres for textiles and non-woven textiles, or for fishing nets. Moreover, the non-woven fabric can be used in the sanitary sector for nappies, sanitary towels etc. The fibres can also be utilised as weldable reinforcing fibres in special papers.

The compositions can also be utilised with success also for the production of sheets for thermoforming, extruded or coextruded with other layers of polymers such as polylactic acid or other polyesters or polyamides or materials based on starch then thermoformed to form containers for food, agriculture and others. The material can be used for injection moulding of containers, cutlery or other things, and has a very high speed of crystallisation and a very high crystallinity.

The material according to the invention can also contain polymeric additives such as polyethylene waxes and polypropylene, PET and PTB, polystyrene, copolymers of ethylene and propylene with functional carboxylic groups, carboxylate, methacrylate, acrylate or hydroxylic groups or else combined with these polymers in coextrusions, coinjections or the like. The material can be utilised as a matrix in the blend with destructured starch according to the processes described in Novamont Patents (EP-0 327 505, EP-0 539 541, EP-0 400 532, EP-0 413 798, EP-0 965 615 with the possibility of forming complexes with the starch or simply utilising the destructured starch, converted and/or complexed as a submicronic filler for the polyester.

They can be used as coating films for biodegradable expanded materials based on polyesters, polyamides; thermoplastic starch and complexed starch or simply blends of starch with other polymers or with the material of the present invention.

The material, as it is or in mixture with starch or other polymers can be obtained as an expanded material to form containers for fruit and vegetables, meat, cheese and other food products, or containers for fast food. It can also be obtained in the form of expanded particles which can be agglomerated for industrial packaging or in the form of injected foam.

The mixture according to the invention will now be described with the following non-limititive examples.

EXAMPLES

Examples 1-7

Polymers constituting the mixture:
Aliphatic polyester: polybutylene sebacate produced from sebacic acid and butandiol with monobutyl stannoic acid catalyst according to Example 1 of WO 00/55236.
Poly L-lactic acid with a D-lactic content of 6%: 4040 Cargill.
Formed into a film on a Ghioldi machine:
Diameter=40mm, L/D=30; rpm=45; die: diameter=100 mm; air gap=0.9 mm; land=12; flowrate=17 kg/h; temperature profile: 120-150-190×2; temperature filter=190×2; head temperature=190×2.
Film: width=400 mm; thickness=25 μm.

The determination of the values of transmittance, both at the source port ($T_{SOURCE}$) and at the entry port ($T_{entr}$) was effected by means of a HAZEGUARD SYSTEM XL-211.

The values of breaking load (α), elongation at break (ε) and modulus of elasticity (E) were determined in accordance with the ASTM D 882-91 by means of an INSTRON 4502 instrument.

The values of permeability, expressed in g30 μm/m²24 h were determined at 38° C. with a relative humidity of 10% on one side of the film to guarantee a Δ humidity equal to 90% in static conditions with cups of diameter 61.8 mm and a depth of 28.5 mm filled with $H_2O$ to a height of 10 mm from the bottom. The cups were put in a climatic cell positioned within a perforated box which guarantees the absence of air currents within it which may cause possible turbulence phenomena on the surface of the specimen, and thus an uncontrolled increase in the exchange efficiency. The values found identify the grams of water referred to 30 μm of thickness of film which passed through a square metre of surface in twenty-four hours.

Results of the tests conducted are plotted in Table 1. Tests 1-6 were effected on mixtures containing 0.3% of erucamide (slip agent) whilst Tests 1a, 3a, 5a, 6a and 7 were conducted on mixtures without erucamide.

The heat-seal strenght of the mixture according to example 3 was tested according to the method disclosed in EP-1 033 393; values lower than 0.5 Kg/15 mm were obtained

Comparative Examples 8-11

Comparative examples 8-11 were made with BIONOLLE a commercially available aliphatic polyester: examples 8-9 with BIONOLLE 1903 (polybutylensuccinate homopolymer) and example 10-11 with Bionolle 3001 (polybutylensuccinate-adipate copolymer). The films obtained according to these examples show permeability values outside the range of the compositions according to the present invention.

Table 2 shows the ΔH values referred to the polyesters component of the mixture prior to melt mixing ($\Delta H_1$ and $\Delta H_2$) and to the polyesters in the mixture ($\Delta H_A$ and $\Delta H_B$). The table refers to the compositions of example 3, 5, 9 and 11. Examples 3 and 5 are according to the invention whereas examples 9 and 11 refer respectively to Bionolle 1903 and Bionolle 3001.

The values have been determined on films of about 25-30 μm. A Perkin Elmer DSC 7 analyzer was used. $\Delta H_1$ and $\Delta H_2$ are the fusion entalpy values of the polyesters prior to melt mixing. $\Delta H_1 + \Delta H_2$ is the sum of the heat fusion values normalized in relation to the mixtures percentages. The values are expressed in J/g. The Differential Scanning Calorimetry has been performed raising the temperature at a rate of 20° C. per minute.

TABLE 1

| Example | A % | B % | A/A + B | Permeability g30 μm/m² 24 h | $T_{source}$ % | $T_{entr}$ % | σ (MPa) | ε (%) | E (MPa) |
|---|---|---|---|---|---|---|---|---|---|
| 1 | 100 | 0 | 100 | 544 | 71 | 94 | 46 | 646 | 629 |
| 1a | 100 | 0 | 100 | 714 | — | — | — | — | — |
| 2 | 60 | 40 | 60 | 170 | 38.5 | 90.4 | 36.5 | 362 | 1464 |
| 3 | 50 | 50 | 50 | 86 | 67 | 92.8 | 35 | 60 | 2007 |
| 3a | 50 | 50 | 50 | 82 | — | — | — | — | — |
| 4 | 40 | 60 | 40 | 69 | 73 | 92 | 34 | 69 | 2018 |
| 5 | 30 | 70 | 30 | 84 | 79.7 | 92.4 | 38 | 202 | 2166 |
| 5a | 30 | 70 | 30 | 107 | — | — | — | — | — |
| 6 | 0 | 100 | 0 | 274 | 92 | 95 | 58 | 6 | 2517 |
| 6a | 0 | 100 | 0 | 292 | — | — | — | — | — |
| 7 | 70 | 30 | 70 | 442 | — | — | — | — | — |
| 8 | 100 | 0 | 100 | 635 | 70.5 | 94.0 | 64 | 355 | 790 |
| 9 | 50 | 50 | 50 | 180 | 82 | 94.0 | 47 | 281 | 1580 |
| 10 | 100 | 0 | 100 | 1013 | 73 | 94.0 | 62 | 505 | 332 |
| 11 | 50 | 50 | 50 | 269 | 83 | 94.0 | 43 | 386 | 1327 |

TABLE 2

| Example | Polyester:Polylactic acid | Polyester ΔH1 | Polylactic acid ΔH2 | ΔH1 + ΔH2 | Polyester ΔHA | Polylactic acid ΔHB | ΔHA + ΔHB |
|---|---|---|---|---|---|---|---|
| 3 | 50:50 | 88 | 29.9 | 58.95 | 64 | 15.8 | 79.8 |
| 5 | 30:70 | 88 | 29.9 | 47.3 | 39.4 | 12.8 | 52.2 |
| 9 | 50:50 | 59 | 29.9 | 44.5 | 13.99 | 22.57 | 36.56 |
| 11 | 50:50 | 38 | 29.9 | 33.95 | 11.8 | 14.9 | 26.7 |

The invention claimed is:

1. A biodegradable mixture obtained by melt mixing polyesters comprising:
   (A) An aliphatic polyester obtained from aliphatic diacids selected from the group consisting of azelaic acid, sebacic acid, brassylic acid, mixtures thereof and mixtures of said acids with aliphatic dicarboxylic acids and/or aliphatic hydroxyacids containing more than 50 mole % of azelaic acid, sebacic acid and brassylic acid, and from aliphatic diols said polyester having modulus of elasticity lying between 400 and 900 MPa and breaking elongation greater than 200% on blown film of about 25-30 μm, average ponderal molecular weight greater than 55,000 and a melting point from 40 to 95° C.;
   (B) A polymer of lactic acid chosen among L or D polylactic acid, L,D-polylactic, meso polylactic or lactic acid copolymer with hydroxyacids or lactones thereof containing at least 75% of L-lactic or D-lactic acid having average ponderal molecular weight greater than 70,000 and with modulus of elasticity greater than 1500 MPa;
in which the mixture contains plasticizers in quantities less than 5% by weight with respect to the quantity of aliphatic polyester and polymer of the lactic acid the concentration by weight of A with respect to (A+B) is in the range of 30 to 60% and blown films of thickness between 25-30 μm have modulus of elasticity greater than 1400 MPa, permeability to water from 170 to 40 g30 μm/m²24 h a transmittance at the entrance port lying between 90 and 95% and in which the sum of the fusion enthalpy $\Delta H_A$ and $\Delta H_B$ of the two polyesters in the mixture is greater than the sum of the fusion enthalpies $\Delta H_1$ and $\Delta H_2$ of the polyesters prior to melt mixing.

2. A mixture according to, claim 1 in which the aliphatic polyester is obtained from mixtures of azelaic acid and/or sebacic acid and/or brassylic acid with aliphatic dicarboxylic acids and, optionally, aliphatic hydroxyacids containing more than 70 mole % of azelaic acid and/or sebacic acid and/or brassylic acid.

3. A mixture according to claim 2, in which the hydroxy acid is selected from the group containing glycolic acid, lactic acid, 3-hydroxybutyric, 4-hydroxybutric, 3-hydroxyvaleric, 4-hydroxyvaleric, 6-hydroxycaproic, and cyclic esters of hydroxycarboxylic acids, glycolidies, dimmers of glycolic acid, ε-caprolactone and 6-hydroxycaproic acid.

4. A mixture according to claim 1 in which the aliphatic diol is selected from the group comprising ethylene glycol, diethylene glycol, triethylene glycol, polyethylene glycol, diethylene glycol, 1-2 and 1-3 propylene glycol, 1,3-butandiol, 1,4-butandiol, 3-methyl-1,5-pentandiol, 1,6-hexandiol, 1-9 nonandiol, dipropylene glycol, 1, 11-undecandiol, 1,13-tridecandiol, neopentyl glycol, polytetramethylene glycol and 1,4-cyclohexane dimethanol, cyclohexane diol or mixtures thereof.

5. A film produced by blowing or flat head extrusion from mixtures according to claim 1.

6. A film according to claim 5, in which the mixture contains one or more inorganic additives such as silica, calcium carbonate, talc, kaolin, kaolinite, oxide of zinc, wollastonite, hydrotalcite, lamellar inorganic substances functionalized or not with organic molecules capable of delamellating in the mixing phase with the polymeric mixture or with one of the individual polymers of the mixture to give nanocomposites.

7. A film according to claim 6 in which the content by weight of inorganic additives in the mixture lies between 0.05 and 3.0.

8. Packets for food or industrial products and clothing, adhesive tapes, tapes for napples, coloured ornamental tapes, adhesive tapes of different form, film for packaging flowers, plants and gift items, produced from film according to claim 7.

9. Bags and films for dry products such as bread, biscuits, crackers, crisps, chipsters, chocolate, cheese, meat, vegetables, welding and tear tape, and film for sealing containers, produced from film according to claim 7.

10. Film according to claim 7 surface treated with aluminum or silica or laminated.

11. Multi-layer film comprising at least one film according to claim 7 and one layer of polylactic acid or other polyester or destructured or non-destructured starch and its blends with synthetic and natural polymers said multi-layer film optionally comprising a layer of aluminium and other materials or a vaccum-metalized layer with aluminum, silica and other inorganic materials.

12. Fibers for woven and non-woven textiles or for fishing nets produced from mixtures according to claim 1.

13. Sheets for thermoforming, extruded or coextruded with other layers of polymers then thermoformed into trays for food, and agricultural products obtained from mixtures according to claim 1.

14. Containers for yoghurt, cheese, meat, biscuits, crisps, snacks, trays for industrial use, containers for fragile objects, produced from sheet according to claim 13.

15. Containers, cutlery, disposable objects, injection moulded from biodegradable polymeric mixtures according claim 1.

16. Foam sheet produced with mixtures according to claim 1 and formed into containers for food such as meat, cheese, vegetables, drinks, containers for fast food.

17. Agglomerable expanded particles produced from biodegradable polymeric mixtures according to claim 1 for packages for use in the industrial sector.

* * * * *